US009185321B1

(12) United States Patent
Laframboise et al.

(10) Patent No.: US 9,185,321 B1
(45) Date of Patent: Nov. 10, 2015

(54) APPARATUS, SYSTEM AND METHOD FOR PROCESSING VIDEO DATA, AUDIO DATA AND ANCILLARY DATA

(75) Inventors: Andre Laframboise, Notre Dame de l'Ile Perot (CA); Marwan Al-Habbal, Greenfield Park (CA); Sebastien Michel, Terrebonne (CA); Francois Charron, Fabreville (CA)

(73) Assignee: Matrox Electronic Systems, Ltd., Dorval (CA)

( * ) Notice: Subject to any disclaimer, the term of this patent is extended or adjusted under 35 U.S.C. 154(b) by 133 days.

(21) Appl. No.: 13/531,395

(22) Filed: Jun. 22, 2012

(51) Int. Cl.
*H04N 5/44* (2011.01)
*H04N 21/418* (2011.01)
*H04N 21/436* (2011.01)
*H04N 21/485* (2011.01)

(52) U.S. Cl.
CPC .............. *H04N 5/44* (2013.01); *H04N 21/4183* (2013.01); *H04N 21/436* (2013.01); *H04N 21/485* (2013.01)

(58) Field of Classification Search
USPC ......................................................... 348/553
See application file for complete search history.

(56) References Cited

U.S. PATENT DOCUMENTS

| 7,669,206 B2 * | 2/2010 | Sherwani ...................... 719/318 |
| 2003/0158940 A1 * | 8/2003 | Leigh ............................ 709/226 |
| 2006/0153475 A1 * | 7/2006 | Ruggiero ....................... 382/276 |
| 2009/0183028 A1 * | 7/2009 | Arnold et al. ................... 714/16 |

* cited by examiner

Primary Examiner — Michael Teitelbaum
(74) Attorney, Agent, or Firm — Rhodes Donahoe, LLC

(57) ABSTRACT

An apparatus is configured to process at least one of video data, audio data and ancillary data to generate an output for broadcast. The apparatus includes a plurality of processing components and a control engine configured to receive at least one topology from a host system, each of the at least one topology provides a grouping of the plurality of processing components to process the at least one of the video data, the audio data and the ancillary data received by the apparatus, respectively. For each of the at least one topology, the control engine is configured to determine commands for execution by the processing components on a frame-by-frame basis, to generate the commands for execution by the processing components, and to send commands to the processing components to process the data.

17 Claims, 8 Drawing Sheets

APPARATUS, SYSTEM AND METHOD FOR PROCESSING VIDEO DATA, AUDIO DATA AND ANCILLARY DATA

BACKGROUND OF INVENTION

1. Field of Invention

Embodiments of the invention generally relate to audio and video processing. More specifically, at least one embodiment relates to processing audio and video signals in topologies maintained by an audio/video/ancillary data subsystem.

2. Discussion of Related Art

The challenges presented to audio and video processing systems, especially those employed in live broadcasts, are substantial. Many applications of audio and video processing systems require high performance and high reliability. In some applications, even a momentary fault can result in an on-air glitch apparent to a large audience of viewers and/or listeners.

Audio and video systems are often provided as a host system and an additional apparatus that processes the audio and video data based on instructions received from the host system. Despite being a distinct piece of hardware, these audio and video processing apparatuses are completely dependent on communication with the host system. For example, a host system can provide data and control signals required for operation of the audio/video processing apparatus. Such an approach results in an architecture that uses resources of the host system (that may be needed for other tasks) and is immediately rendered inoperative if the host system lags or crashes or should communication between the host system and the apparatus be interrupted or cease altogether.

The importance of high reliability results in some audio/video apparatuses being equipped with a mechanical relay that bypasses the audio/video processing apparatus in the event of a loss of power. However, this approach simply couples the input of the audio/video apparatus to the output of the apparatus. The approach does not allow more advanced functionality of the audio/video processing apparatus to be used.

SUMMARY OF INVENTION

According to one aspect, an audio/video/ancillary data processing system configured to improve on-air reliability, improve the speed of fault recovery and/or improve failsafe operation autonomously changes state without aid of the host system. In some embodiments, state-based behavior of the audio/video/ancillary data processing system is provided without aid of the host. Such state-based behavior facilitates autonomous configuration of the topologies employed by the audio/video/ancillary data processing system. In some embodiments to maintain a live stream, the audio/video/ancillary data processing system autonomously configures the topology even where the host system becomes inoperative.

According to one aspect, an apparatus is configured to process at least one of video data, audio data and ancillary data to generate an output for broadcast. In some embodiments, the apparatus includes a plurality of processing components and a control engine configured to receive at least one topology from a host system, wherein each of the at least one topology provides a grouping of the plurality of processing components to process the at least one of the video data, the audio data and the ancillary data received by the apparatus, respectively. Further, for each of the at least one topology, the control engine is configured to determine commands for execution by the processing components on a frame-by-frame basis, to generate the commands for execution by the processing components on the frame-by-frame basis, and to send commands to the processing components to process the at least one of the video data, the audio data and the ancillary data on the frame-by-frame basis. According to a further embodiment, the processing components are configured to execute the commands received from the control engine.

According to one embodiment, the control engine is configured to allow the apparatus to continue to operate to process the video data, audio data and ancillary data with the at least one topology and in accordance with the instructions with minimal further communication from the host system, once the at least one topology and instructions are received from the host system by the control engine. According to another embodiment, the control engine is configured to reply to a query from the host system by communicating the at least one topology to the host system.

According to still another embodiment, the apparatus includes a general purpose input configured to receive an input that triggers a change from the at least one topology received from the host system to a different topology. In a further embodiment, the control engine is configured to determine commands for execution by the processing components on the frame-by-frame basis, generate the commands on the frame-by-frame basis, and to send commands to the processing components to process the at least one of the video data, the audio data and the ancillary data on the frame-by-frame basis in the different topology without communication from the host system. In still a further embodiment, the apparatus includes a non-volatile memory coupled to the control engine wherein the different topology includes a default state and an associated default topology stored in the non-volatile memory by a user application operating on the host system. According to one embodiment, the control engine includes a memory and, using at least some of the content of the non-volatile memory, the memory included in the control engine is programmed for the default topology in response to a failure of the user application.

In yet other embodiments, the processing components include at least one output and the default state includes topology to communicate at least some data received by the apparatus to the at least one output. According to one embodiment a topology operating as the current state includes the at least one output, the at least one output is present in a description of the default topology, and the topology operating as the current state communicates at least some data received by at least one processing component included in the plurality of processing components to the at least one output.

According to one embodiment, following a resumption of communication between the host system and the control engine following a temporary interruption, the user application operating on the host system queries the control engine for a list of at least one topology operating in a current state.

According to another aspect, a method of processing at least one of video data, audio data and ancillary data to generate an output for broadcast with the system including a plurality of processing components and a control engine is provided. In some embodiments, the method includes establishing at least one default topology by a user application operating on the host system. In a further embodiment, the process includes switching, by the control engine, from the at least one processing topology to the at least one default topology in response to a failure of at least one of the user application and the host system. In a still further embodiment, the process includes operating in the at least one default topology with minimal communication from the host system. According to one embodiment, the process includes generating the output for a live broadcast using the system.

As used herein, the term "video data" refers to data that includes a series of frames that can be displayed on a display device, such as a television screen, computer monitor, video monitor, etc. As will be recognized by those of ordinary skill in the art, video data includes data that is recorded with video recording equipment, images captured with a camera and graphics data (including images, text and characters) generated by a computer, for example, by a graphics processing unit. The video data can be in a compressed or uncompressed format.

As used herein, the term "audio data" refers to data that is used to generate sound waves in the frequency range of human hearing. As will be recognized by those of ordinary skill in the art, each of video data and audio data includes the respective data in either analog or digital form. The audio data can be in a compressed or uncompressed format.

As used herein, the term "ancillary data" refers to data concerning video signals and/or audio signals that is embedded in the video signal or that will be embedded in the video signal. For example, ancillary data can be included in the non-active or blanking portion of the video signal. For example, the ancillary data can be horizontal ancillary data (HANC) located in the horizontal blanking portion of the video signal. The ancillary data can also be vertical ancillary data (VANC) located in the vertical blanking portion of the video signal. Ancillary data can include closed captioning or subtitling text. Ancillary data can also include various types of metadata, such as Active Format Description (AFD), Video Payload Identifier (VPID), time code, Ancillary Time Code (ATC), Error Detection and Handling (EDH), Dolby$^T$ Audio Metadata, camera position, and various types of data essence.

As used herein, the term "processing component" refers to any element included in the audio/video/ancillary data subsystem that receives at least one of audio data, video data and ancillary data. Some examples include input connectors, output connectors, input interfaces, output interfaces, nodes, buffers, memories, transform elements (for example, scalers or resizers), compositing elements (for example, mixers) and/or elements that receive any of the data being processed by the audio/video/ancillary data subsystem until the data is output by the audio/video/ancillary data subsystem. A processing component can include either or both of a hardware element(s) and a software element(s).

As used herein, the term "topology" or "topologies" refers to an organization of processing components grouped together to provide a desired control logic with which to process at least one of audio data, video data and ancillary data. According to some embodiments, a topology employs all of the processing components available in an audio/video/ancillary data subsystem. According to other embodiments, a topology employs only a portion of the processing components available in the audio/video/ancillary subsystem. As will be recognized by those of ordinary skill in the art in view of the disclosure included herein, an audio/video/ancillary data subsystem can operate with multiple topologies simultaneously.

As used herein, the term "watchdog" refers to a monitoring engine that detects a condition and triggers an event in response to the detection of the condition.

A condition detected by a watchdog can include a fault condition, the activation of an input to the audio/video/ancillary data subsystem, and/or the watchdog being forced (for example, by a user application). Examples of fault conditions which may be detected by a watchdog include anyone or any combination of: a failure of a user application, a failure of a host system, a loss of communication between the audio/video/ancillary data subsystem and either or both of the user application and the host system, and a loss of power to the audio/video/ancillary data subsystem.

An event triggered by a watchdog can include an event triggering a change in a topology being operated on the audio/video/ancillary data subsystem. According to some embodiments, a watchdog is associated with a default topology to be implemented when the watchdog is triggered. An event triggered by watchdog can also include the activation of an output of the audio/video/ancillary data subsystem.

As used herein, a "default topology" refers to a topology that is available for configuration of processing components of the audio/video/ancillary data subsystem in response to an event, such as an event triggered by a watchdog.

As used herein to describe processing, the term "frame-by-frame" refers to data that is communicated, processed and/or displayed using a series of individual frames where each frame is associated with a particular point in time. For example, a video signal output for display includes a series of frames where each frame is displayed at a point in time different than other frames included in the video signal.

One of ordinary skill in the art will understand that a video signal can include any of or any combination of video data, audio data and ancillary data. For example, a frame of video can include visible portions of the video frame and non-visible portions of the video frame where, for example, video data is included in the visible portion of the frame, and either or both of audio data and ancillary data can be embedded in non-visible portions of the video frame.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
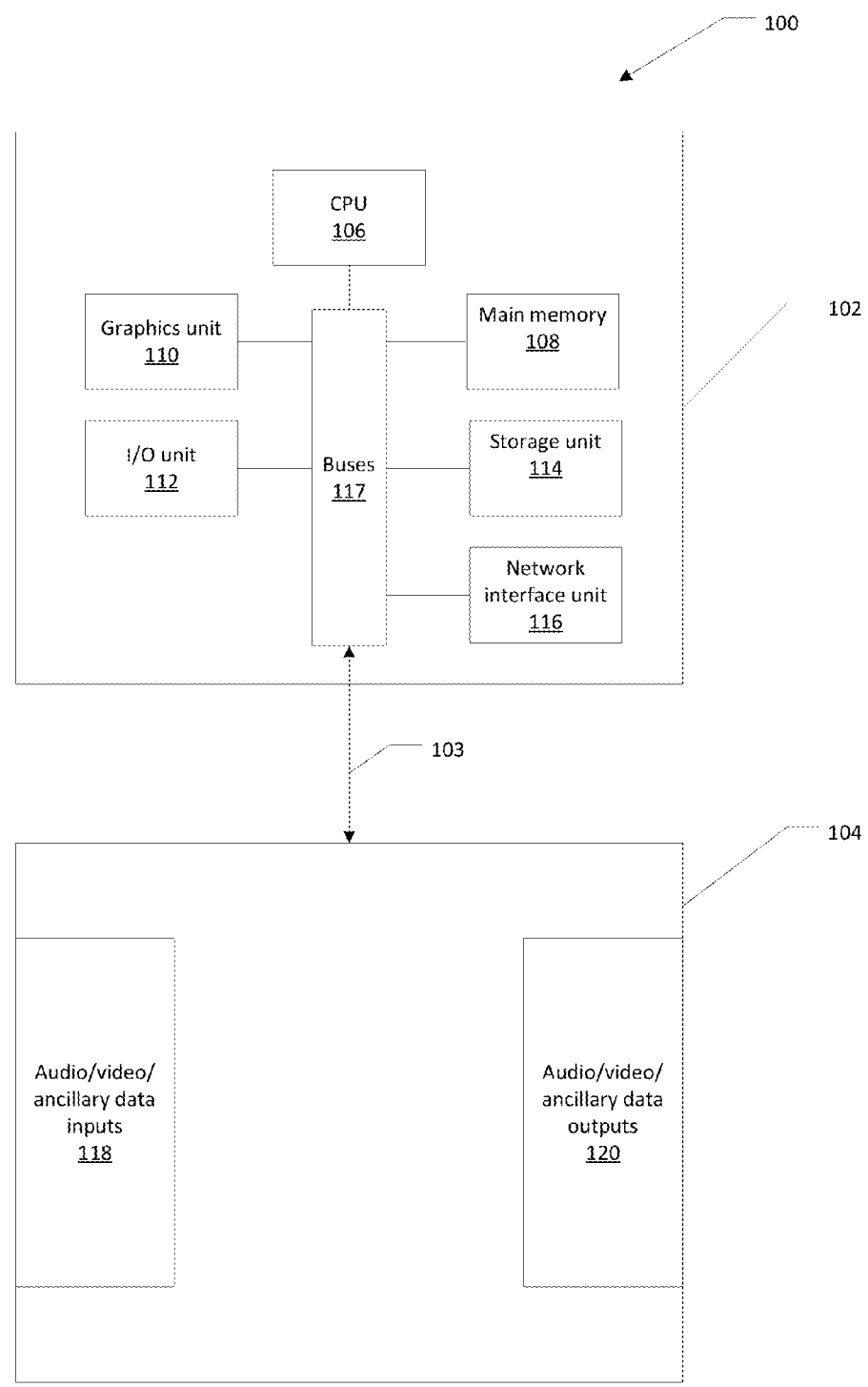
FIG. 1 illustrates an audio/video/ancillary data processing system in accordance with one embodiment.

Referring now to FIG. 1, a system 100 for processing any of video data, audio data and ancillary data is illustrated. In accordance with some embodiments, the system 100 includes a host computing system 102, an audio/video/ancillary data subsystem 104, and a communication interface 103 which connects the host computing system 102 to the audio/video/ancillary data subsystem 104.

In the illustrated embodiment, the host computing system 102 includes a central processing unit (CPU) 106, a main memory 108, a graphics processing unit 110, an input/output (I/O) unit 112, a storage unit 114, a network interface unit 116, and one or more communication buses 117. According to some embodiments, the one or more communication buses 117 are employed for communication between the CPU 106 and each of the preceding elements of the host computing system 102. Further, the one or more communication buses 117 can also be employed for communication between any of the preceding elements of the host computing system 102 and one or more other elements of the host computing system 102. For example, the host computing system 102 can be a suitably-programmed general-purpose computer. As will be apparent to one of ordinary skill in the art in view of the disclosure included herein, the host computing system 102 provides one example of the configuration of the host computing system 102; however, a variety of other configurations can be employed provided that the host computing system 102 has the capability of providing instructions to the audio/video/ancillary data subsystem 104 for the processing of at least one of audio data, video data and ancillary data.

In some embodiments, the audio/video/ancillary data subsystem 104 is provided in the form of a card that plugs into a slot available in the host computing system 102, for example, a Peripheral Component Interconnect (PCI) slot. In some embodiments, the audio/video/ancillary data subsystem 104 is located remote from the host computing system 102 and the communication interface 103 is a wired or wireless transmission link. According to some embodiments, in addition to the host computing system 102, one or more other computing systems (not shown) may provide instructions and/or data to the audio/video/ancillary data subsystem 104 for the processing of at least one of audio data, video data and ancillary data.

In general, the host computing system 102 and the audio/video/ancillary data subsystem 104 employ the communication interface 103 in a bidirectional manner for communication of data and/or control information with one another. According to some embodiments, the communication interface 103 is a Peripheral Component Interconnect (PCI) bus, for example, a PCI express bus. According to another embodiment, the communication interface 103 is a Universal Serial Bus (USB).

In accordance with various embodiments, the audio/video/ancillary data subsystem 104 includes audio/video/ancillary data inputs 118 and audio/video/ancillary data outputs 120.

In operation, the host computing system 102 may have one or more user applications operating on it where the user applications provide instructions and/or data (such as audio data, video data, ancillary data, and graphical data) for operation of the audio/video/ancillary data subsystem 104. According to various embodiments, the host computing system 102 provides one or more topologies in which the audio/video/ancillary data subsystem 104 processes one or more of the audio data, video data and ancillary data.

According to some embodiments and consistent with the requirements of the user application, the audio data, video data and/or ancillary data can be received at the audio/video/ancillary data inputs 118 and/or received from the host computing system 102 via the communication interface 103; processed by the audio/video/ancillary data subsystem 104; and then output at the audio/video/ancillary data outputs 120 and/or sent to the host computing system 102 via the communication interface 103. Graphical data (e.g., generated by the graphics unit 110) can also be received from the host computing system 102 via the communication interface 103 and processed by the audio/video/ancillary data subsystem 104. The audio data, video data and/or ancillary data received from the host computing system 102 via the communication interface 103 can come from the storage unit 114, the network interface unit 116, or another component of the host computing system 102. The audio data, video data and/or ancillary data sent to the host computing system 102 via the communication interface 103 can be sent to the storage unit 114 (for storage), network interface unit 116 (for transmission to a network), or other component of the host computing system 102. According to further embodiments and consistent with the requirements of the user application, audio data, video data and/or ancillary data can be received at the audio/video/ancillary data inputs 118; sent to the host computing system 102 via the communication interface 103; processed by one or more components of the host computing system 102 such as the graphics unit 110 (e.g., to add 3-D video effects) or the CPU 106; sent back to the subsystem 104 via the communication interface 103; processed by the audio/video/ancillary data subsystem 104; and finally output at the audio/video/ancillary data outputs 120. As will be apparent to one of ordinary skill in the art, other "workflows" are possible.

According to various embodiments, the audio/video/ancillary data subsystem 104 can be configured to include one or more topologies, where each topology can perform one or more of the following operations: 1) a pass-through operation; 2) a capture operation; 3) a playback operation; 4) a scaling operation; 5) a video compositing operation; and 6) a character-generation operation. In view of the disclosure herein, one of ordinary skill in the art will recognize that the audio/video/ancillary data subsystem 104 can be configured in additional and different topologies (and to perform other operations) depending on the embodiment.

In various embodiments, the audio/video/ancillary data subsystem 104 can be employed in a video server that performs ingest and/or play out operations. In an ingest or capture operation, video streams received by the subsystem 104 are communicated from the subsystem 104 to a storage device, such as the storage unit 114 of the host computing system 102. A playback operation includes reading one or more video files stored on one or more storage devices (e.g., storage unit 114 of the host computing system 102) and then outputting them as video streams. The video files that are played-out can be video files that were captured by the video server and, optionally, edited using a non-linear video editing application.

In still another example, the audio/video/ancillary data subsystem 104 can be employed in a live character generator (CG) system. Such a system combines one or more of live video, graphical content, and/or video content played back from a video file to form composite video. The composite video is output for display, storage, and/or transmission. Live CG systems are most often used in the live broadcasts of sporting events, news, weather and election results.

Figure 2:
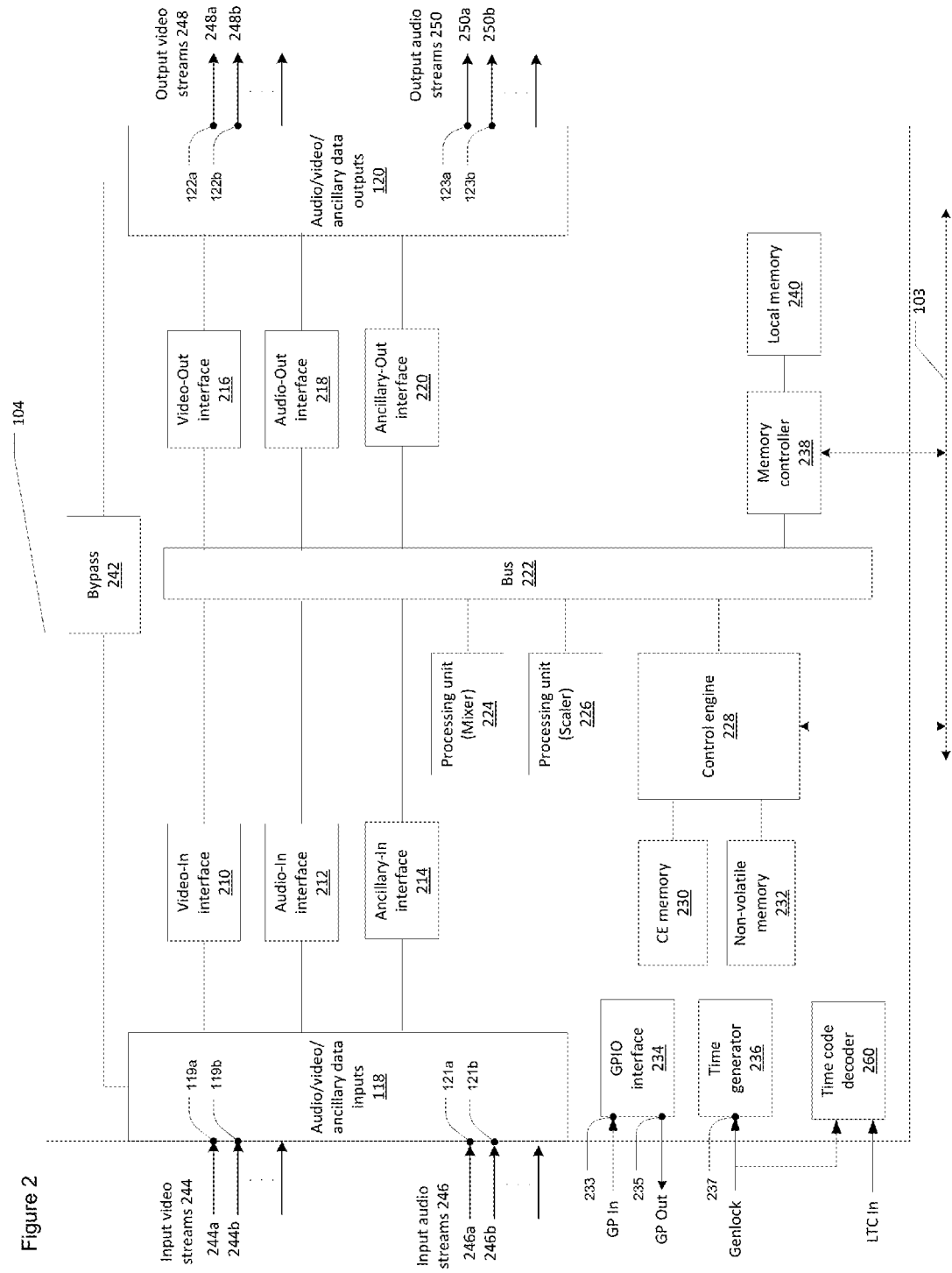
FIG. 2 illustrates a block diagram of the audio/video/ancillary data subsystem of FIG. 1 in accordance with one embodiment.

Referring now to FIG. 2, the audio/video/ancillary data subsystem 104 is illustrated in accordance with further embodiments. In the illustrated embodiment, the audio/video/ancillary data subsystem 104 includes inputs 118 for audio data, video data and ancillary data, outputs 120 for audio data, video data and ancillary data, at least one video-in interface 210, at least one audio-in interface 212, at least one ancillary-in interface 214, at least one video-out interface 216, at least one audio-out interface 218, and at least one ancillary-out interface 220. In addition, the audio/video/ancillary data subsystem 104 includes a communication bus 222, and a plurality of processing units including, in the illustrated embodiment, a mixer 224 and a scaler 226. The subsystem 104 also includes a control engine 228, a control engine (CE) memory 230, a non-volatile memory 232, a memory controller 238, and a local memory 240. Finally, in the illustrated embodiment, subsystem 104 includes a general purpose input output (GPIO) interface 234 which includes a general purpose input 233 and a general purpose output 235;

a time generator 236 which includes an input 237; a time code decoder 260; and a bypass 242.

In various embodiments, inputs 118 include one or a plurality of video inputs 119 and audio inputs 121 for receiving one or a plurality of video streams 244 and audio streams 246, respectively. The video streams 244 received at video inputs 119 can include embedded audio and/or ancillary data. In some embodiments, inputs 118 can include separate inputs (not shown) for receiving ancillary data.

In addition, the outputs 120 include one or a plurality of video outputs 122 and audio outputs 123 for outputting one or a plurality of output video streams 248 and output audio streams 250, respectively. The video streams 248 output from video outputs 122 can include embedded audio and/or ancillary data. In some embodiments, outputs 120 can include separate outputs (not shown) for outputting ancillary data.

The video streams 244 and audio streams 246 received at inputs 118 can be received from a variety of sources, such as a computer, Digital Video Recorder (DVR), DVD Player, Video Tape Recorder, digital or analog video camera, Blu-Ray Disc, Satellite Receiver, network connection, video router or video equipment upstream in the broadcast chain.

The output video streams 248 and output audio streams 250 can be transmitted to various display, storage or transmission devices, such as a computer monitor, television display, video monitor, Digital Video Recorder (DVR), DVD Writer, Video Tape Recorder, Satellite Transmitter, network connection, video router or video equipment downstream in the broadcast chain.

In some embodiments, the video inputs 119 and the audio inputs 121 include connectors for a connection of a hardwired connection (for example, wire or cable). According to various embodiment, the video inputs 119a, 119b can include any of the following connector-types and protocols: RCA connectors; BNC connectors; S-video connectors; FireWire connectors; network connection, Serial Digital Interface (SDI), Digital Video Interface (DVI), High-Definition Multimedia Input (HDMI) and composite analog video. According to various embodiments, the audio inputs 121a, 121b can include various protocols (e.g., AES/EBU (AES3), analog audio, etc.) and connector-types (e.g., BNC connectors, XLR connectors, RCA connectors, etc.). The preceding provide examples and other connectors and protocols can be used depending upon the embodiment.

As will be described further herein, the video streams can be received in a variety of formats and stored in a variety of formats because the audio/video/ancillary data subsystem 104 can include inputs, outputs, and topologies that allow the receipt and processing of any of the variety of formats. Depending on the embodiment, the audio/video/ancillary data subsystem 104 can receive and process audio data, video data and ancillary data in analog format or digital format. Further, in various embodiments, the audio/video/ancillary data subsystem 104 can process video data in compressed or uncompressed form and/or audio data in compressed or uncompressed form.

In general, signals received at the inputs 118 are communicated to the bus 222 via a corresponding interface 210, 212, 214. Thus, the video stream 244 received at the video input 119 is communicated to the bus 222 via the video-in interface 210. Similarly, the audio stream 246 received at the audio input 121 is communicated to the bus 222 via the audio-in interface 212 and the ancillary data received in any of the inputs 118 is communicated to the bus 222 via the ancillary-in interface 214. According to some embodiments, a respective video-in interface 210 is connected to one of the video inputs 119; for example, where two video inputs 119a and 119b are employed a first video-in interface is connected to the video input 119a and a second video-in interface is connected to the video input 119b. The audio-in interface 212 may be configured similarly such that where two audio inputs 121a and 121b are employed a first audio-in interface is connected to the audio input 121a and a second audio-in interface is connected to the audio input 121b.

According to some embodiments, the video-in interface(s) 210 is employed to digitize (if needed), format and convert the video portion of an input signal coming from the audio/video/ancillary data inputs 118 for further processing by one or more additional processing components included in the audio/video/ancillary data subsystem 104. For example, the video-in interface 210 places the video data into a digital format that is both compatible with the memory structure included in the audio/video/ancillary data subsystem 104 and convenient for processing. Similarly, according to some embodiments, the audio-in interface(s) 212 is employed to digitize (if needed), format and convert the audio portion of an input signal coming from the audio/video/ancillary data inputs 118 for further processing by one or more additional processing components included in the audio/video/ancillary data subsystem 104. The audio interface 212 places the audio data into a digital format that is both compatible with the memory structure included in the audio/video/ancillary data subsystem 104 and convenient for processing.

According to some embodiments, a time generator 236 provides a time base (reference) for the audio/video/ancillary data subsystem 104. According to some embodiments, the time generator 236 includes a hardware circuit to decode an input signal such as a genlock signal (e.g., black-burst, analog, digital, tri-level synch, network, etc.) received on an input 237 and can generate the time base based on the input signal. For example, the time base can include a vertical synchronization signal (providing the length of a video frame or field), a horizontal synchronization signal (providing the length of a line of the frame or field), and/or a pixel clock (providing the length of a pixel). The time base provided by the time generator 236 can be used for synchronization purposes by various components of the audio/video/ancillary data subsystem 104 such as, for example, the control engine 228, the input interfaces 210, 212 and 214, and the output interfaces 216, 218 and 220. The control engine 228 can use the time base to generate the frame and field-level commands for the processing components. The video-in interface 210 can resynchronize input video streams 244 to the time base (e.g., genlock signal). The audio-in interface 212 can resample input audio streams 246 to the time base. The ancillary-in interface 214 can process input ancillary data according to the time base. The output interfaces 216, 218 and 220 can use the time base to output video/audio/ancillary data streams that are synchronized to the time base (e.g., genlock signal.) These embodiments allow the mixing (using the mixer 224) of video streams and audio streams from video/audio sources having different time bases.

According to further embodiments, the ancillary-in interface 214 is employed to digitize (if needed), format and convert the vertical and the horizontal ancillary-data portion of an input signal received at the audio/video/ancillary data inputs 118. The ancillary-in interface 214 places the ancillary data into a digital format that is both compatible with the memory structure included in the audio/video/ancillary data subsystem 104 and convenient for processing.

In various embodiments, the signals received at the inputs can be processed to provide a pass through to the outputs 120 via the respective output interfaces 216, 218 and 220. Depending on the embodiment, various other processing acts can also be performed on the data received at the inputs before it is communicated to the outputs 120. The video stream 248 provided at the video output 122 is communicated from the bus 222 via the video-out interface 216. Similarly, the audio stream 250 provided at the audio output 123 is communicated from the bus 222 via the audio-out interface 218, and the ancillary data provided to any of the outputs 120 is communicated from the bus 222 via the ancillary-out interface 220.

In some embodiments, the video outputs 122 and the audio outputs 123 include connectors for a connection of a hard-wired connection (for example, wire or cable). According to various embodiment, the video outputs 122a, 122b can include any of the following connector-types and protocols: RCA connectors; BNC connectors; S-video connectors; FireWire connectors; network connection, Serial Digital Interface (SDI), Digital Video Interface (DVI), High-Definition Multimedia Input (HDMI) and composite analog video. According to various embodiments, the audio outputs 123a, 123b can include various protocols (e.g., AES/EBU (AES3), analog audio, etc.) and connector-types (e.g., BNC connectors, XLR connectors, RCA connectors, etc.). The preceding provide examples and other connectors and protocols can be used depending upon the embodiment. As described above, audio data can be included in a video signal communicated from a video output 122.

According to some embodiments, the video-out interface(s) 216 is employed to format and convert the video portion of the signal coming from the memory and provide it to the audio/video/ancillary data outputs 120. For example, the video-out interface 216 places the video data into a format that is both suitable for transmission to one or more further devices and convenient for use with a suitable transport protocol. Similarly, according to some embodiments, the audio out interface(s) 218 is employed to format and convert the video portion of the signal coming from the memory and provide it to the audio/video/ancillary data outputs 120. The audio interface 218 places the audio data into a format that is both compatible with the memory structure included in the audio/video/ancillary data subsystem 104 and convenient for use with a suitable transport protocol.

According to further embodiments, the ancillary-out interface 220 is employed to format and convert the ancillary data portion of the signal coming from the memory and provide it to the audio/video/ancillary data outputs 120. The ancillary-in interface 220 places the ancillary data into a digital format that is both compatible with the memory structure included in the audio/video/ancillary data subsystem 104 and convenient for use with a suitable transport protocol.

According to various embodiments, the audio data, the video data and the ancillary data are routed from the audio/video/ancillary data outputs 122 to one or more of monitors, recorders, antennas, monitoring equipment etc. The preceding provide just some examples and other equipment can receive the data routed from the audio/video/ancillary data outputs 120 depending on the embodiment.

According to some embodiments, the processing components included in the audio/video/ancillary data subsystem 104 are implemented using one or more field-programmable gate arrays (FPGAs), such as FPGAs from the Xilinx Virtex-5 FPGA family. In one embodiment, the audio/video/ancillary data subsystem 104 is implemented using 2 or more FPGAs. In a further embodiment, the audio/video/ancillary data subsystem 104 is implemented using 3 FPGAs. In addition to the connection between the control engine 228 and the communication bus 222, the control engine 228 is also connected to the communication interface 103. The control engine 228 is also connected to the control engine memory 230 and the non-volatile memory 232. Depending on the embodiment, either or both of the control engine memory 230 and the non-volatile memory 232 can be included in the control engine 228 or as a memory device external to the control engine 228.

In various embodiments, the control engine 228 acts as the central processing unit of the audio/video/ancillary data subsystem 104. In some embodiments, the control engine 228 controls all the components of the audio/video/ancillary data subsystem 104 at the level of the individual frames or fields of the audio data, the video data and the ancillary data. For example, the control engine 228 can schedule and program execution of the operations of all of the processing components included in the audio/video/ancillary data subsystem 104. Further, the control engine 228 can analyze, divide, and process topology descriptions received from the host computing system 102 and transform them into a set of commands to the different processing components. These commands can be scheduled for execution on a frame-by-frame basis. In some embodiments, the control engine 228 can respond to queries received from a user application, such as queries regarding topologies and/or settings of the subsystem 104. In some embodiments, the control engine 228 can send information to the host computing system 102 (e.g., the user application) such as information regarding a fault that occurred in the subsystem 104.

The control engine 228 may be implemented in any of software, firmware, hardware or a combination of any of the preceding. According to some embodiments, the control engine 228 is implemented using a microcontroller or microprocessor. According to some embodiments, the control engine 228 is implemented using one or more FPGAs. According to one embodiment, the control engine 228 is implemented using a MicroBlaze FPGA-based soft processor.

In some embodiments, the control engine memory 230 is a random access memory (RAM) configured to hold instructions and data for processing by the control engine 228. In some embodiments, the control engine memory 230 stores a current state, where the current state includes a set of topologies currently operating on the subsystem 104, a set of watchdogs, and other settings related to the subsystem 104 (such as the genlock settings). In some embodiments, the control engine memory 230 also stores a default state, where the default state includes a set of default topologies that can be triggered in response to an event (e.g., triggered by a watchdog), a set of watchdogs, and other settings related to the subsystem 104.

According to a further embodiment, the non-volatile memory 232 is employed to store the permanent state which is loaded when power to the subsystem 104 is turned on. The permanent state can include a set of default topologies, a set of watchdogs, other settings related to the subsystem 104, and the content of one or more nodes (e.g., static images or video sequences). In some embodiments, the contents of the non-volatile memory 232 can be erased/written-to at any time by a user application to establish a new permanent state. In some embodiments, the non-volatile memory 232 is a flash memory.

The memory controller 238 is also connected to each of the communication bus 222 and the communication interface 103. In addition, in the illustrated embodiment, the memory controller 238 is connected to the local memory 240. The communication bus 222 is employed by the audio/video/ancillary data subsystem to allow communication between various elements included in the system. For example, the bus 222 allows all components (for example, all processing components) to communicate with the memory controller 238 to send read/write commands to portions of the local memory 240.

According to one embodiment, the memory controller 238 is responsible to service and arbitrate all read/write commands coming from the different components connected to the bus 222. In addition, it also addresses, divides, distributes and accesses the memory resources included in the audio/video/ancillary data subsystem 104 (for example, the local memory 240).

According to a further embodiment, the local memory 240 includes RAM stores and maintains audio data, video data and ancillary data in a digital format where the data is stored in discrete portions of time. These discrete portions of time correspond to one or a series of frames or fields where the frames and fields included in the frames form the basic data unit of the digital audio/video/ancillary signals that are processed by the audio/video/ancillary data subsystem 104. The preceding organization allows other elements of the audio/video/ancillary data subsystem 104 to access the data based on the associated portion of time being processed by the element.

The portions into which the local memory 240 is organized can be referred to as "nodes." A node identifies a portion of the local memory 240 where the portion of the memory includes a set of one or more data buffers. In general, these data buffers hold the frames and fields of the audio data, the video data and the ancillary data.

According to some embodiments, the GPIO interface 234 provides for connection to external triggers that are either received by or transmitted from the audio/video/ancillary data subsystem 104. According to one embodiment, the GP input 233 is connected to a set of user pushbuttons. According to this embodiment, the system can respond to selection of a pushbutton by the user by executing a transition to a default state that is previously known or newly provided to the control engine 228.

According to some embodiments, the time code decoder 260 can extract time code information from either the Linear (or Longitudinal) Time Code (LTC) input or the Genlock input. The extracted time code information can be provided to the host computing system 102 or used by the control engine 228 to accurately trigger routing and/or processing of audio/video/ancillary data streams.

Embodiments of the audio/video/ancillary data subsystem 104 provide an architecture that allows for topologies of the subsystem to be autonomously initiated and maintained by the control engine 228 with minimal, or in some embodiments no, communication with the host system 102. In general, the preceding is accomplished because the architecture of the audio/video/ancillary data subsystem 104 enables state-based behavior. For example, in some embodiments, the control engine 228 actively maintains buffer-based control of the topologies. This approach shields the audio/video/ancillary data processing performed by the subsystem 104 from many of the most common events that negatively affect reliability, for example, events that negatively affect on-air reliability of the audio/video/ancillary data processing.

In accordance with the illustrated embodiment, the audio/video/ancillary data subsystem 104 includes a bypass 242. The bypass 242 is employed by the audio/video/ancillary data subsystem 104 to directly connect the audio/video/ancillary data inputs 118 to the audio/video/ancillary data outputs 120 in the event that the power supply to the audio/video/ancillary data subsystem is interrupted.

The audio/video/ancillary data subsystem 104 illustrated in FIG. 2 can include other system elements that are not illustrated here in the interest of clarity.

Various embodiments described herein include state-based processing by the audio/video/ancillary data subsystem 104. According to these embodiments, a state can include a set of one or more topologies, a set of one or more watchdogs, and one or more settings related to the subsystem 104 (such as, the genlock settings). In some embodiments the current state is stored in the control engine memory 230 and the control engine 228 continually reads the current state from the memory and, for each of the topologies in the current state, generates commands for the processing components included in the audio/video/ancillary data subsystem 104 to maintain operation of the topology(s). As described herein, in some embodiments, the control engine 228 autonomously maintains states once established and can also autonomously implement one or more defaults states once established.

Figure 3A:
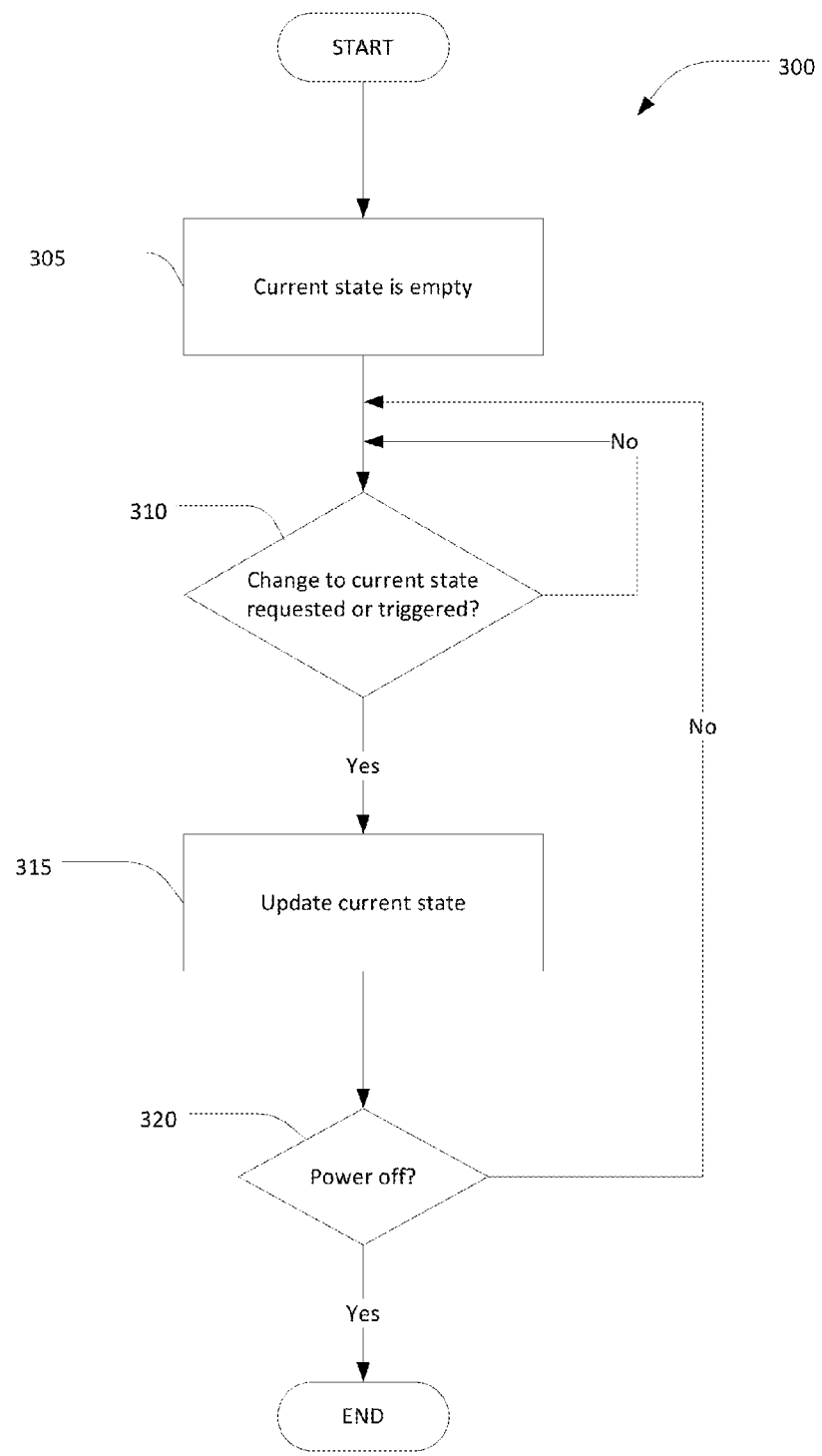
FIGS. 3A-3C illustrate control of various states of the audio/video/ancillary data subsystem of FIG. 2 in accordance with one embodiment.
Figure 3B:
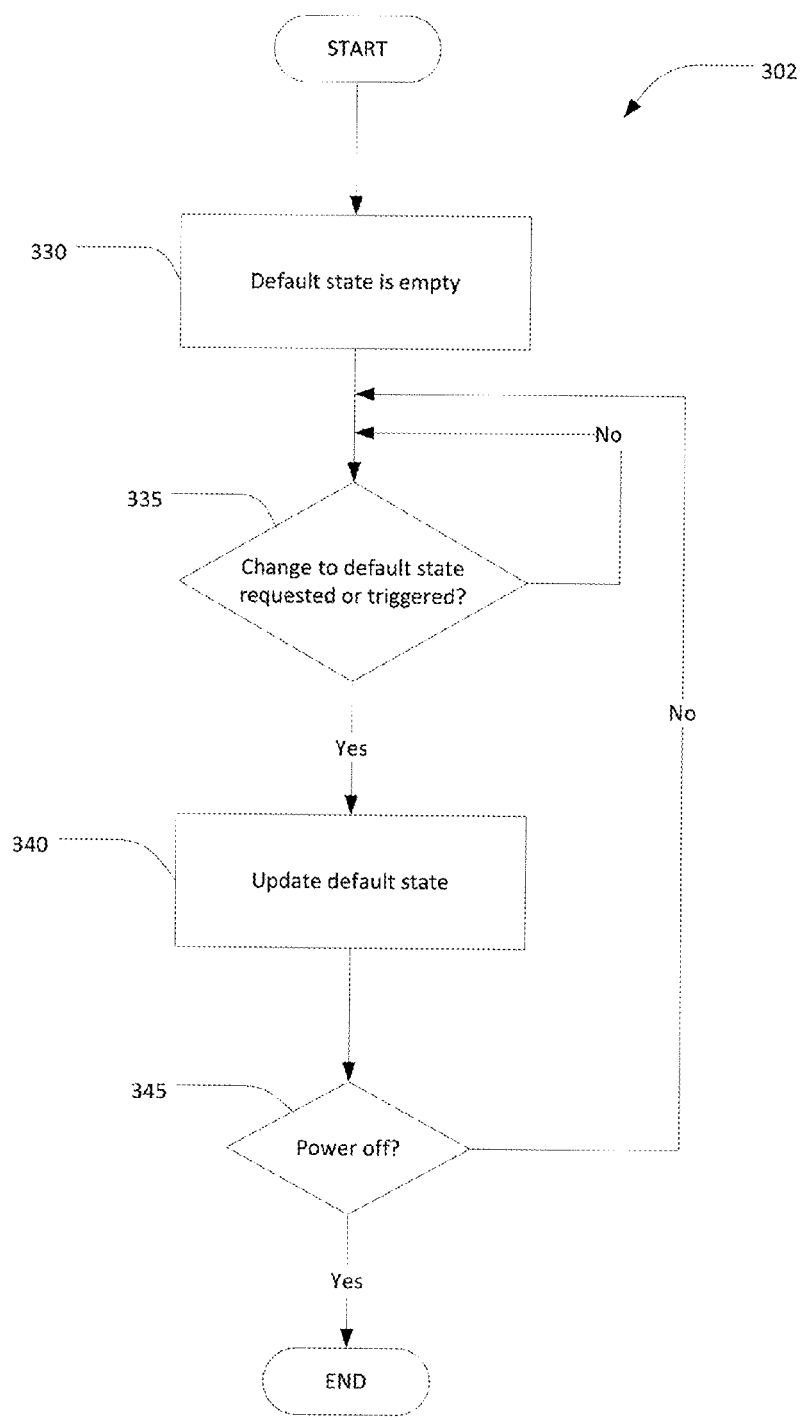
Figure 3C:
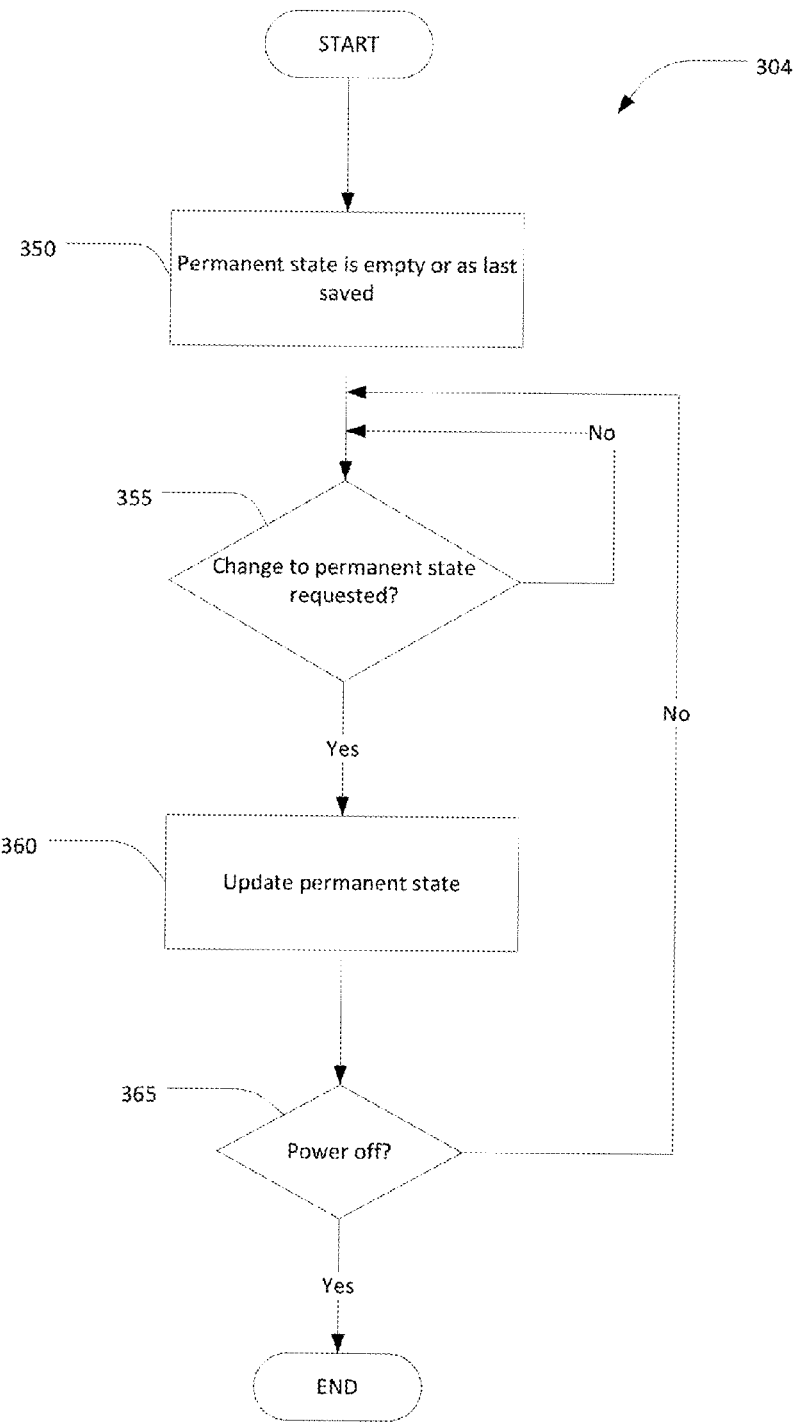

Referring now to FIGS. 3A-3C, processes for creating and managing states for the audio/video/ancillary data subsystem 104 are illustrated.

FIG. 3A illustrates a process 300 for updating a current state. The current state can include a set of topologies currently operating on the subsystem 104, a set of watchdogs, and other settings related to the subsystem 104 (such as the genlock settings).

In FIG. 3A, at Act 305, the current state is empty (no topologies are operating on the audio/video/ancillary data subsystem 104). With the current state empty, the control engine 228 may perform general tasks such as monitoring activity on the audio/video/ancillary data inputs 118 and input 237 (which receives the genlock signal) and monitoring the temperature of the subsystem 104. However, unless the bypass 242 is in use, the audio/video/ancillary data subsystem 104 does not provide any output video streams 248 or output audio streams 250 when the current state is empty.

At act 310, the control engine 228 receives a request for a change to the current state or an event occurs that triggers a change to the current state. The request or event at 310 can take a variety of forms depending on the current topology/topologies of the audio/video/ancillary data subsystem 104 and the change necessary to achieve a desired topology/topologies.

At Act 310, the control engine 228 can receive a request from a user application to create and operate a new topology on the audio/video/ancillary data subsystem 104.

Where a current state already exists, the control engine 228 can receive a variety of requests from the user application. In one embodiment, the control engine 228 receives a request from a user application to modify a topology (associated with the current state) operating on the audio/video/ancillary data subsystem 104, at Act 310. According to this embodiment, the control engine 228 can receive a request to add a processing component to and/or remove a processing component from a topology currently operating on the audio/video/ancillary data subsystem 104, at Act 310. In a further embodiment, the control engine 228 receives a series of requests to create and add a plurality of processing components required to provide a complete topology for processing data received by the subsystem 104. Where a given topology already exists, the control engine 228 can receive one or a series of requests to modify the current topology to create a new topology.

In a further embodiment, the control engine 228 receives a request from a user application to modify operating parameters of a processing component of a topology operating on the audio/video/ancillary data subsystem 104, at Act 310. In the case of the scaler 226, operating parameters can include the horizontal and vertical scaling factors, and parameters specifying how to handle ancillary data associated with the video being scaled. In the case of the mixer 224, operating parameters can include the number of sources to mix; the order in which to mix the sources; the position in the composite video frame at which to place each source; parameters specifying how to handle audio and ancillary data associated with the sources (for example, specifying from which source to select the audio and/or ancillary data); and other parameters, such as transparency factors, etc. In the case of the video-in interface 210 and video-out interface 216, operating parameters can include the video clipper, the procamp (hue, saturation, brightness, and contrast), and control parameters of the key signal (invert, expand, compress, etc.)

In still another embodiment, the control engine 228 receives a request from a user application to stop operating, and to delete a topology currently operating on the audio/video/ancillary data subsystem 104, at Act 310.

In some embodiments, where a watchdog was previously set up and armed to trigger a transition to a default topology, the armed watchdog can trigger a change to the current state at Act 310.

In further embodiments, the control engine 228 can receive a request from a user application to create a new watchdog in the current state, at Act 310. In still another embodiment, at Act 310, the control engine 228 can receive a request from the user application to set control parameters of a watchdog in the current state. Control parameters of the watchdog can include, for example, the armed or unarmed status of the watchdog, the condition to be detected by the watchdog (e.g., the activation of an input signal at the general purpose input 233, a time out resulting from a fault condition, etc.), the event to be triggered by the watchdog (e.g., the loading of a default topology, the activation of an output signal at the general purpose output 235), and a topology in the current state to serve as the default topology.

Because of the variety of requests and events at Act 310, the resulting updates to the current state at act 315 can also take a variety of forms.

For example, where the request (at act 310) is for the creation of a new topology to the current state, the control engine 228 adds (at act 315) a new topology to the current state in the control engine memory 230 where the new topology provides a structure that organizes and holds a plurality of processing components for the processing of audio/video/ancillary data.

Similarly, where the request (at act 310) is for a modification of a topology in the current state, the control engine 228 adds or removes a processing component to/from the topology in the current state (at act 315). In some embodiments, the audio/video/ancillary data processing "subtask" associated with a new processing component takes effect immediately. That is, as soon as the control engine 228 reads the current state including a new processing component, it begins generating commands to the new processing component.

Where the request (at act 310) is for the deletion of a topology from the current state, the control engine 228 deletes the selected topology from the current state in the control engine memory 230 (at act 315).

Where a watchdog was triggered at act 310, the control engine 228 copies the default topology associated with the watchdog that was triggered from the default state in the control engine memory 230 to the current state. According to one embodiment, rather than copying the default topology, the control engine 228 compares and modifies the topology in the current state to match the default topology in the default state.

Where the request is a request to add new a watchdog, the control engine 228 adds the watchdog to the current state.

Provided that the audio/video/ancillary data subsystem 104 has power, the process 300 moves from Act 315 to Act 310 at Act 320. Should the subsystem 104 lose power, the process 300 terminates at Act 320.

Referring now to FIG. 3B, a process 302 is illustrated in accordance with some embodiments. The process 302 illustrates the updating of the default state for the audio/video/ancillary data subsystem 104. According to these embodiments, the default state refers to one or more (a set) of default topologies stored in the control engine memory 230. The default topologies in the default state are associated with watchdogs, respectively. The audio/video/ancillary data subsystem 104 can arm watchdogs, in response to requests from the user application. In general, when an armed watchdog is triggered, the default topology in the default state that is associated with the triggered-watchdog is copied from the default state to the current state (or a topology included in the current state is modified to match the default topology in the default state). In some embodiments, the default state (including topologies and watchdogs) is stored in the control engine memory 230. According to further embodiment, the default state employed when the audio/video/ancillary data subsystem 104 is first powered-up is stored in the non-volatile memory 232.

At Act 330, the process 302 begins with the default state empty such that no default topologies are stored in the control engine memory 230. At Act 335, a request is received by the control engine 228 where the request requires a change to the default state or an event occurs that triggers a change to the default state. The request at Act 335 can take a variety of forms.

In one embodiment, the control engine receives a request from a user application to make a topology currently operating in the audio/video/ancillary data subsystem 104 a default topology.

According to another embodiment, the control engine 228 receives a request from a user application to remove a default topology from the default state, at Act 335. In still another embodiment, the control engine 228 receives a request from a user application to clear the default state, at Act 335.

In yet another embodiment, a default state containing default topologies and associated watchdogs has been saved as a permanent state in the non-volatile memory 232. The permanent state is to be loaded when power to the audio/video/ancillary data subsystem 104 is turned on. According to this embodiment, power-on results in a default-state change being triggered, at Act 335.

At act 340 the default state is updated in response to the change requested/triggered at Act 335. A current state may also have a watchdog associated with the topology.

Where the request at Act 335 is to make the topology in the current state a default topology, the control engine 228 copies a topology and watchdog from the current state to the default state at Act 340.

Where the request is to remove a default topology from the default state, the control engine 228 removes the default topology from the default state, at Act 340. Similarly, where the request is to clear the default state, control engine 228 removes the default topology, at Act 340. In an embodiment in which power-on triggers a loading of the default state, the control engine 228 copies the permanent state (that contains default topology and watchdogs) from the non-volatile memory 232 to the default state in the control engine memory 230.

Provided that the audio/video/ancillary data subsystem 104 is provided with power, the process 302 moves from Act 340 to Act 330 at act 345. Should the audio/video/ancillary data subsystem lose power, the process 302 terminates at Act 345.

As described above, FIG. 3B illustrates a process of updating the default state of the audio/video/ancillary data subsystem 104. In addition, the audio/video/ancillary data subsystem 104 includes a permanent state that includes a set of default topologies stored in the non-volatile memory 232. The default topologies included in the permanent state are copied to the default state in the control engine memory 230 as part of the steps performed when power to the apparatus is turned on, see for example, Act 335 above.

FIG. 3C illustrates a process 304 for updating the permanent state of the audio/video/ancillary data subsystem 104. At Act 350, the process 304 begins with the permanent state either empty or containing the default topologies that were last saved to it. At Act 355, the control engine 228 receives a request from a user application to change the permanent state. For example, where a default state containing the default topologies and watchdogs is stored in the control engine memory 230, the control engine can receive a request from the user application to save the default state as a permanent state in the non-volatile memory 232.

Another form of request, at Act 355, is a request to the control engine 228 to clear the permanent state. In another embodiment, the control engine 228 receives a request from a user application to store the contents of a node (a set of buffers in the local memory 240 containing a static image or video sequence, for example) that is part of a default topology in the default state to the permanent state in the non-volatile memory 232. In yet another embodiment, the control engine 228 receives a request from a user application to delete the contents of a node previously saved to the permanent state in the non-volatile memory 232.

At Act 360, the permanent state is updated in response to the change request received at Act 355. Where the request is to save the default state (including default topologies and watchdogs) as the permanent state, the control engine 228 saves the default state as the permanent state in the non-volatile memory 232. In another embodiment, where the request is a request to clear the permanent state, the control engine 228 erases the permanent state that is currently stored in the non-volatile memory 232. In still another embodiment, where the request is a request to store contents of a node as part of a default topology in a default state, the control engine 228 stores the contents of the selected node to the permanent state in the non-volatile memory 232. Where the request is a request to delete the contents of a node from the permanent state stored in the non-volatile memory 232, the control engine 228 erases the contents of previously saved node from the permanent state stored in the non-volatile memory 232.

Figure 4:
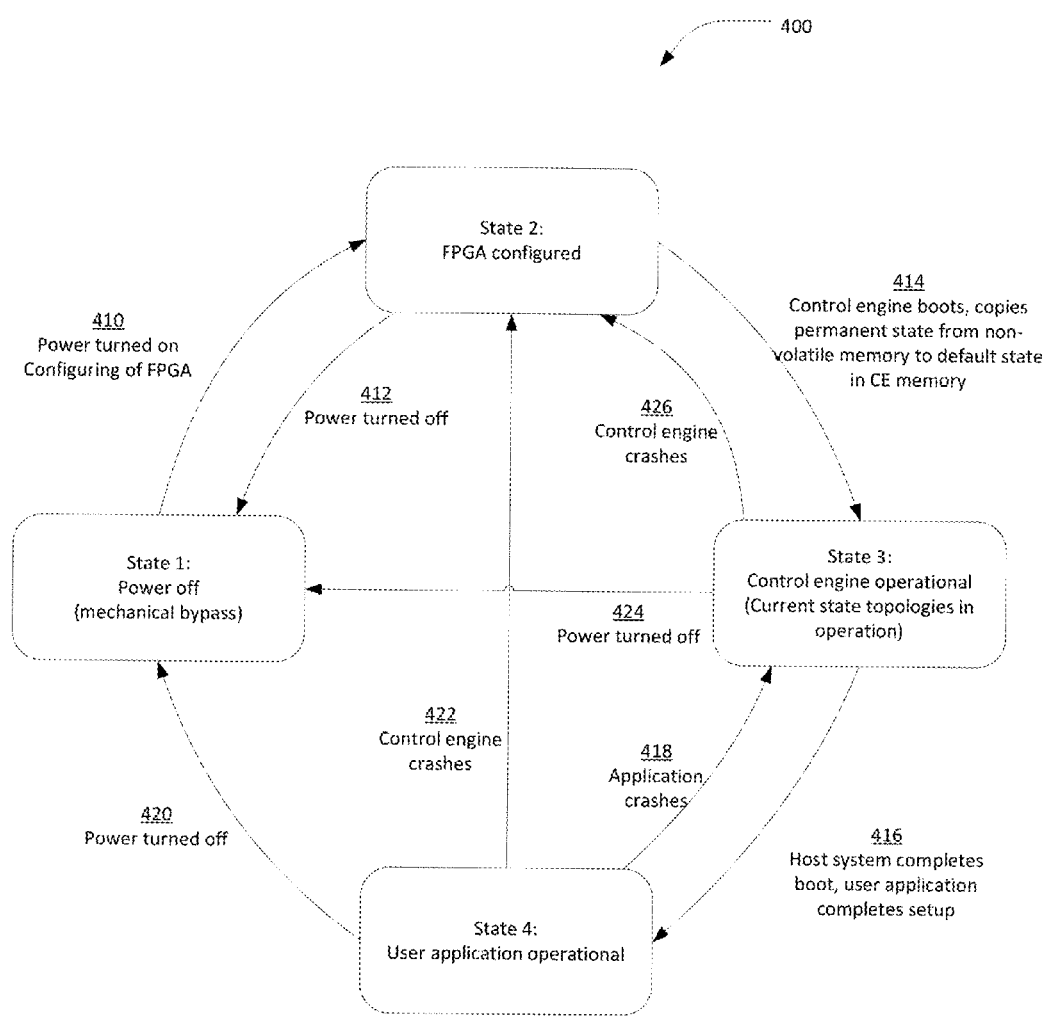
FIG. 4 illustrates a state diagram in accordance with one embodiment.

Referring now to FIG. 4, a process 400 is illustrated for a state diagram in accordance with various embodiments. In the illustrated embodiment, the process 400 includes four states; State 1—Power Off; State 2—FPGA configured; State 3—Control engine operational; and State 4—User Application operational.

In the illustrated embodiment, in State 1, power is off to the audio/video/ancillary data subsystem 104. If desired, the bypass 242 (in this case, a mechanical bypass by means of relay and/or switch, for example) can be used to connect the inputs 118 to the outputs 120. Where for example the audio/video/ancillary data subsystem 104 is being employed for a pass-through operation (with or without scaling and mixing), the bypass 242 (in this case, a mechanical bypass) allows the video streams 244 and/or audio streams 246 received at the inputs 118 to be directly connected to the outputs 120.

At act 410, power is turned on to the audio/video/ancillary data subsystem 104. One or more FPGAs employed in the subsystem 104 are configured to provide their programmed functionality by downloading firmware from the non-volatile memory 232 into the FPGAs. The subsystem 104 then enters State 2.

In State 2, one or more of the FPGAs employed in the subsystem 104 are operational. As a result, one or more of the processing components of the subsystem 104 are operational. However, the control engine 228 is not fully operational. For example, the control engine is not yet operational to generate and send commands to the processing components required to perform more complex processing operations such as storing data to memory, scaling, and mixing. If desired, the bypass 242 (in this case, a bypass through circuitry included in the FPGA(s) or a mechanical bypass by means of relay and/or switch) can be used to connect the inputs 118 to the outputs 120.

At act 412, power is turned off with the audio/video/ancillary data subsystem 104 in State 2. Here, the audio/video/ancillary data subsystem 104 returns to State 1 where the subsystem 104 can operate in a mechanical bypass mode if desired.

Provided power remains on when the audio/video/ancillary data subsystem 104 reaches State 2, at act 414, the control engine 228 boots from source code or firmware stored in the non-volatile memory 232. For example, the control engine 228 is configured or programmed by downloading source code or firmware from the non-volatile memory 232 to the control engine memory 230. The control engine 228 copies the permanent state (including default topologies and watchdogs) from the non-volatile memory 232 to the default state in the control engine memory 230. The control engine 228 copies the default topologies having triggered watchdogs from the default state to the current state in the control engine memory 230. Completion of Act 414 results in the audio/video/ancillary data subsystem 104 reaching State 3.

In State 3, the control engine 228 is fully operational. The control engine 228 regularly reads the current state from the control engine memory 230 and, for each of the topologies in the current state, generates commands for execution by the processing components of the audio/video/ancillary data subsystem 104 required to maintain operation of the topologies.

Should power be turned off, at Act 424, with the audio/video/ancillary data subsystem 104 in State 3, the subsystem 104 returns to State 1. Otherwise, the process 400 moves to Act 416.

In the case where the subsystem 104 is powered (at step 410) as a result of the host computing system 102 being powered, while the subsystem 104 transitions from State 1 to State 3, the host computing system 102 performs a regular booting process following a power-up. At Act 416, the operating system of the host computing system 102 completes its booting process, and the user application completes the setup process required to communicate with the subsystem 104. Successful completion of Act 416 results in the audio/video/ancillary data subsystem 104 reaching State 4.

In State 4, the user application is fully operational. For example, the user application can query the control engine 228 for the list of topologies operating on the subsystem 104 and can request ownership of a topology operating on the subsystem 104. Once the user application owns a topology operating on the subsystem 104, the user application can send requests to the control engine 228 to modify the topology or delete the topology (as detailed with reference to FIG. 3A).

The user application can also send requests to create and operate new topologies, create watchdogs and control parameters of the watchdogs, create default topologies, and store default topologies to the non-volatile memory 232, as detailed with reference to FIGS. 3A, 3B and 3C. The user application can also provide content to the subsystem 104, such as video data, audio data, ancillary data, and/or graphical data. The control engine 228 also updates the current state, default state, and permanent state, in response to requests from a user application or events triggered by watchdogs, as described with reference to FIGS. 3A, 3B and 3C.

When the audio/video/ancillary data subsystem 104 is operating in State 4 and the user application crashes, at act 418, the subsystem 104 returns to State 3. In State 3, the control engine 228 can maintain operation of the topologies in the current state or, in response to a triggered watchdog, transition to a default topology in the default state.

When the audio/video/ancillary data subsystem 104 is operating in State 3 or State 4 and the control engine 228 crashes (at act 422 or act 426), the subsystem 104 returns to State 2.

When the audio/video/ancillary data subsystem 104 is operating in State 4 and the power to the subsystem 104 is turned off, the audio/video/ancillary data subsystem returns to State 1 where the subsystem 104 can operate in a mechanical bypass mode if desired.

The ability of the control engine 228 to autonomously load-in a default state and operate in the default state and associated default topology provides substantial advantage. Where the host system 102 is not providing (or at least not updating) any data for processing and output by the audio/video/ancillary data subsystem 104, the broadcast continues with all necessary content even where the user application and/or host system is inoperative. Where the host system 102 is providing and/or updating at least some of the content included in the broadcast, operation in State 3 minimizes the disruption seen/heard by viewers because a substantial part of the content may still be processed and communicated for broadcast in the event that the host is unavailable (for example, because the host is going through the re-boot and/or recovery process and is not yet ready to take control of the topology of the audio/video/ancillary data subsystem 104.

Figure 5:
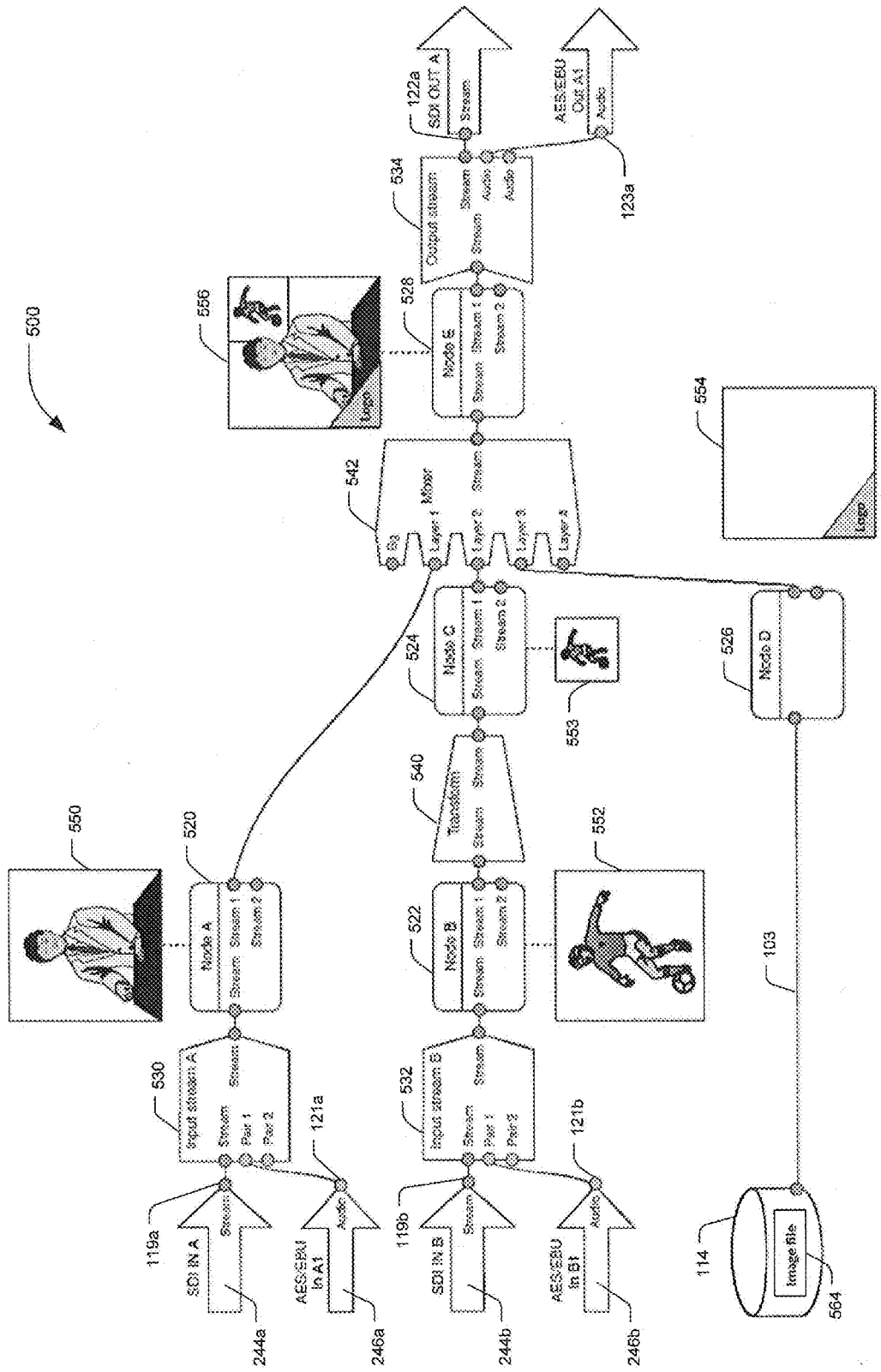
FIG. 5 illustrates a topology of the audio/video/ancillary data subsystem in accordance with one embodiment.

Referring now to FIG. 5, a topology 500 for the audio/video/ancillary data subsystem 104 is illustrated in accordance with one embodiment. The user application configures the audio/video/ancillary data subsystem 104 in the topology 500 by communicating the topology to the control engine 228 for the processing of one or more input streams. According to the illustrated embodiment, the topology 500 can be used in live character generation by the audio/video/ancillary data subsystem 104.

The topology 500 illustrated in FIG. 5 includes a plurality of processing components including: a first video input 119a; a second video input 119b; a first audio input 121a; a second audio input 121b; a first node 520 (node A); a second node 522 (node B); a third node 524 (node C); a fourth node 526 (node D); a fifth node 528 (node E); a video output 122a; and an audio output 123a. In addition, the topology 500 includes a first input stream 530, a second input stream 532 and an output stream 534. In the illustrated embodiment, the first input stream 530 includes audio data, video data and ancillary data. The second input stream 532 also includes audio data, video data and ancillary data. Further, the topology 500 includes a transform processing unit 540 and a mixing processing unit 542.

According to one embodiment, the transform processing unit 540 is employed to scale video data. That is, it resizes video received from a node and provides the resized video to another processing component. Where audio data is included in the video signal received by the transform processing unit 540, the audio data can be copied prior to rescaling and later reassembled with the resized video. Where ancillary data is included in the video signal received by the transform processing unit 540, the ancillary data can be copied, altered if necessary to reflect changes applied to the video portion of the stream and then reassembled with the resized video.

According to one embodiment, the mixing processing unit 542 is employed to mix video from multiple nodes into one node so that video compositing can be performed on the video data. Depending on the embodiment, the mixing operation can also include audio data and/or ancillary data.

In the illustrated embodiment, the video signal that is output by audio/video/ancillary data subsystem 104 using the topology 500 includes contents 550 (live anchor) included in the first input stream 530, contents 552 (live event) included in the second input stream 532 (after resizing to provide scaled video 553) and contents of an image 554 (for example, a logo of the broadcasting company) that are combined in a live-CG signal. As should be apparent to one of ordinary skill in the art in view of the disclosure provided herein, the audio/video/ancillary data subsystem 104 can be configured in other topologies, receive the same or different inputs, perform the same or different processing operations on different inputs and generate the same or different outputs.

According to the illustrated embodiment, the first input stream 530 includes a first video stream 244a and a first audio stream 246a of a sports anchor commenting on a live sporting event. The audio/video/ancillary data subsystem 104 also receives the second input stream 532 including a second video stream 244b and a second audio stream 246b of a live sporting event. In addition, the audio/video/ancillary data subsystem 104 receives an image file 564 stored in the storage unit 114, the image file 564 including the image 554.

In this embodiment, each of the first input stream 530 and the second input stream 532 are provided from sources external to the host system 102. Only the image file 564 is provided from the host system. As is described in further detail below, the control engine 228 can maintain operation of the audio/video/ancillary data subsystem 104 in the illustrated topology to generate the output stream 534 without any further input from the host system (where for example, the image file 564 is received from the host system and then stored in the local memory 240).

According to the illustrated embodiment, the output stream 534 includes a video output stream 248a of a composite video frame that includes video data from each of the first input stream 530, the second input stream 532 and an image 554. In addition, the output stream 534 includes the audio output stream 250a of audio data selected from one of the first input stream 530 and the second input stream 532.

With the audio/video/ancillary data subsystem 104 configured in the topology 500, the control engine 228 maintains the topology to allow the subsystem 104 to continue to process data received at the inputs 118 in a live-CG operation and to output the live-CG audio and video data at the outputs 120. The topology 500 results in the control engine 228 providing commands to organize different sets of buffers in the local memory 240 to provide each of node A, node B, node C, node D and node E, respectively.

In the illustrated embodiment, the first input stream 530 is connected to the first node 520, the second input stream 532 is connected to the second node 522 and host storage 114 is connected to the fourth node 526. In addition, the first node 520 is connected to the mixer 542, the second node 522 is connected to the transform processing unit 540, the transform processing unit 540 is connected to the third node 524, the third node 524 is connected to the mixer 542 and the fourth node 526 is connected to the mixer 542. The mixer 542 is connected to the fifth node 528, the fifth node 528 is connected to the output stream 534 and the output stream 534 is connected to the first video output 122a and the first audio output 123a. In addition, the fourth node 526 is connected to the storage unit 114 of the host system by the communication interface 103.

In operation: the first node 520 receives the first input stream 530 where audio data, video data and ancillary data (if applicable) included in the stream 530 is stored; the second node 522 receives the second input stream 532 where audio data, video data and ancillary data (if applicable) included in the stream 532 is stored; and the fourth node 526 receives an image file from the user application where it is stored. The contents of the second node 522 are scaled (resized) with the transform processing unit 540 and then stored in the third node 524 as the resized image 553. Each of the contents the first node 520, the third node 524 and the fourth node 526 are copied and propagated to the mixing processing unit 542, respectively. The mixer creates a composite video frame from the video frames stored in the first node 520, the video frames stored in the third node 524, and video frame stored in the fourth node 526. The resulting composite video is stored in the buffers at the fifth node 528. The contents of the fifth node 526 including audio data, video data ancillary data is output as an output stream 534 to the video output 248a and the audio output for 250a.

Because the content provided to the fourth node 526 is static (is not updated), the user application operating on the host system can have processing delays, crash or close without affecting operation of the processing performed by the audio/video/ancillary data subsystem 104 in the topology 500. In addition, the topology 500 can be stored as a default state in the non-volatile non-volatile memory 232 of the audio/video/ancillary data subsystem 104. The ability to store default states in the audio/video/ancillary data subsystem 104 itself also improves reliability and minimizes both downtime and processing issues that can be noticed by viewers. For example, if the audio/video/ancillary data subsystem loses power, the audio/video/ancillary data subsystem 104 will move from state 4 (where the user application is in control) to State 1 (where the bypass 242 can connect inputs to outputs if desired) in accordance with FIG. 4. Once power to the audio/video/ancillary data subsystem 104 is restored, the control engine 228 can load the default state from the non-volatile memory 232, configure the audio/video/ancillary subsystem topology 502 to quickly begin processing the first input stream 530 and the second input stream 532 before the host is available to take control. Referring to FIG. 4, the preceding operation is a transition from State 1 to State 2 and then to State 3. In addition, the contents of image file 564 (image 554) can also be stored in non-volatile memory 232 from which they can be retrieved at state 3.

If a fault condition affects the availability of the host computing system 102, operation of the audio/video/ancillary data subsystem 104 in state 3 minimizes any disruption in the data (the output stream 534) that is output for broadcast. Further, once a default topology is established using the control engine 228, the recovery of the audio/video/ancillary data subsystem 104 occurs autonomously without any input from the host. The host system 102 has time to re-boot and take control of one or more of the topologies currently operating on the audio/video/ancillary subsystem while a live signal is broadcast. In some embodiments, the user application operating on the host system can query the audio/video/ancillary data subsystem 104 for either or both of the number of topologies currently operating on the audio/video/ancillary subsystem, the nature the topologies and whether the topologies are under the control of any other applications.

Figure 6:
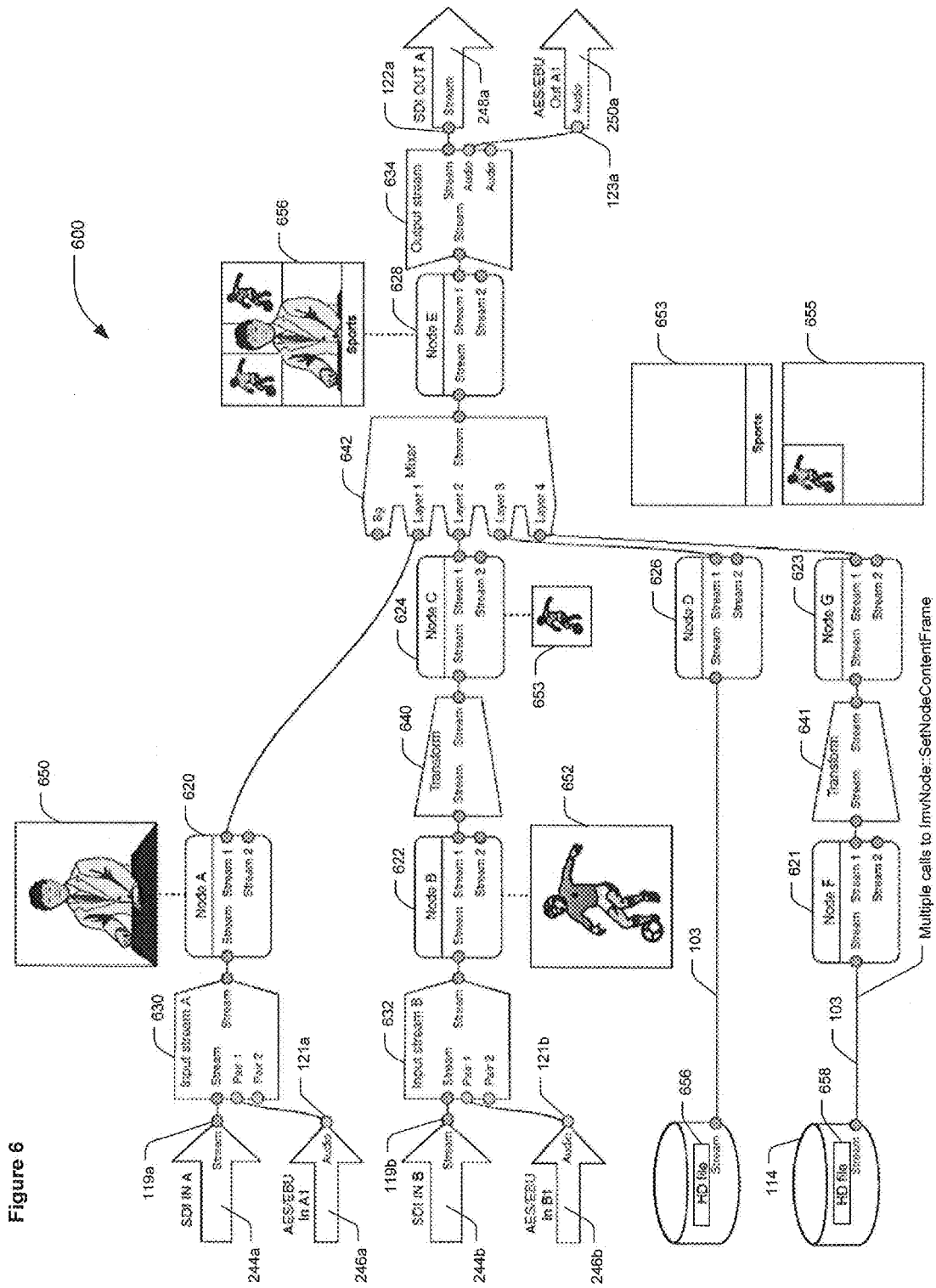
FIG. 6 illustrates a topology of the audio/video/ancillary data subsystem in accordance with another embodiment.

Referring now to FIG. 6, a topology 600 for the audio/video/ancillary data subsystem 104 is illustrated in accordance with one embodiment. Here too, the user application configures the audio/video/ancillary data subsystem 104 in the topology 600 by communicating the topology to the control engine 228 for the processing of one or more input streams. Depending on the embodiment, the topology 600 can be a first topology employed by the user application, or alternatively, the topology 500 can be the first topology employed by the user application. In the latter example, the user application can modify the topology 500 to obtain the topology 600.

The topology 600 illustrated in FIG. 6 includes a plurality of processing components including: a first video input 119a; a second video input 119b; a first audio input 121a; a second audio input 121b; a first node 620 (node A); a second node 622 (node B); a third node 624 (node C); a fourth node 626 (node D); a fifth node 628 (node E); a sixth node 621 (node F); a seventh node 623 (node G); a video output 122a; and an audio output 123a. In addition, the topology 600 includes a first input stream 630, a second input stream 632 and an output stream 634. In the illustrated embodiment, the first input stream 630 includes audio data, video data and ancillary data. The second input stream 632 also includes audio data, video data and ancillary data. Further, the topology 600 includes a first transform processing unit 640, a second transform processing unit 641 and a mixing processing unit 642. In addition, each of the fifth node 626 and the sixth node 621 are connected to the host system 102 by the communication interface 103.

In the illustrated embodiment, the video signal that is output by the audio/video/ancillary data subsystem 104 using the topology 600 includes contents 650 of the first input stream 630, contents 652 of the second input stream 632, graphical and/or textual content 656 received from the host system 102, and video content 658 received from the host system. According to one embodiment the graphical content 656 is provided from a video file stored in the storage unit 114 of the host system 102 which is being played-back. According to another embodiment, the graphical and/or textual content 656 is dynamically generated by the graphics unit 110 of the host system 102.

In this embodiment, each of the first input stream 630 and the second input stream 632 are provided from sources external to the host system 102. Each of graphical content 656 and the video content 658 are provided from the host system 102. However, as is described in further detail below, the control engine 228 can maintain operation of the audio/video/ancillary data subsystem 104 in the illustrated topology to minimize any noticeable error for the viewer of the output stream 634 in the event of a problem with the host system or with communication between the audio/video/ancillary data subsystem and the host system.

According to the illustrated embodiment, in normal operation, the output stream 634 includes the video output stream 248a of a composite video frame that includes video data from the first input stream 630, video data the second input stream 632, graphical content 656 received from the host system and video content 658 received from the host system. In addition, the output stream 634 includes the audio output stream 250a of audio data selected from one of the first input stream 630, the second input stream 632 and the video content 658.

In the illustrated embodiment the first input stream 630 is connected to the first node 620, the second input stream 632 is connected to the second node 622, the graphical content 656 is provided at the fourth node 626 and the storage unit 114 is connected to the sixth node 621. In addition, the first node 620 is connected to the mixer 642, the second node 622 is connected to the first transform processing unit 640, the first transform processing unit 640 is connected to the third node 624, and each of the third node 624, the fourth node 626 and the seventh node 623 are connected to the mixer 642. The mixer 642 is connected to the fifth node 628, the fifth node 628 is connected to the output stream 634 and the output stream 634 is connected to the first video output 122a and the first audio output 123a.

In operation: the first node 620 receives the first input stream 630 where audio data, video data and ancillary data (if applicable) included in the stream 630 is stored; the second node 622 received the second input stream 632 where audio data, video data and ancillary data (if applicable) included in the stream 632 is stored; the fourth node 626 receives and stores graphical and/or textual content from the host system; and the fifth node 621 receives and stores in input stream of a video file being played-back by the host system 102. The contents of the second node 622 are scaled with the first transform processing unit 640 and then stored in the third node 624 as a scaled video 653. The contents of the sixth node 621 are scaled with the second transform processing unit 641 and then stored in the seventh node 623 as a scaled video 655. Each of the contents of the first node 620, the third node 624, the fourth node 626 and the seventh node 623 are copied and propagated to the mixing processing unit 642, respectively. The mixing processing unit 642 creates a composite video frame from the video frame stored in the first node 620, the video frames stored in the third node 624, video frames stored in the fourth node 626 and the video frames stored in the seventh node 623. The resulting composite video is stored in the buffer is at the fifth node 628. The contents of the fifth node 628 including audio data, video data and ancillary data is output as the output stream 634 to the video output 122a and the audio output 123a. Thus, for example, the content 656 of the output stream 634 can include: 1) video frames of the sports anchor (stored in the first node 620); 2) video frames of a scaled sporting event (stored in the third node 622); 3) video frames of graphical and/or textual information showing scores of games (stored in the fourth node 626); and 4) video frames of a scaled replay of a sporting event (stored in the seventh node 623).

According to this embodiment, the control engine 228 maintains the topology 600. However, the topology 600 employs both audio/video/ancillary data content that is input directly to the audio/video/ancillary data subsystem 104 (for example, the first input stream 630 and the second input stream 632) and content that is provided and updated by the user application operating on the host system 102. Thus, in this embodiment, the host system 102 provides updated content, for example, updated graphical and/or textual content 656 and updated video content 658 provided to the buffer at the fourth node 626 and the sixth node 621, respectively.

Here, should the host system experience processing delays, crash or close the ability of the audio/video/ancillary data subsystem 104 to autonomously maintain the topology 600 still provides advantages even though some of the content for the output stream 634 originates from the host system 102. For example, the audio/video/ancillary data subsystem 104 can continue to receive the direct inputs of the first input stream 630 and the second input stream 632 without relying on the host system 102. Where updated content is not received at the fourth node 626 or the sixth node 621, the audio/video/ancillary data subsystem 104 will employ the last available content stored in the buffers at the fourth node 626 and the seventh node 623 and include a replay of that content in the composited video signal provided to the output stream 634.

The use of one or more defaults states can also be advantageous in the embodiment illustrated in FIG. 6. For example, a watchdog can be set up to detect if the user application is inoperative. When such a signal is detected, the watchdog triggers a transition to a default state previously stored by the audio/video/ancillary data subsystem 104. When transition to the default state is triggered, the control engine 228 loads the default topology from the control engine memory 230, configures the audio/video/ancillary data subsystem 104 according to the default topology and begins operation of the corresponding audio/video/ancillary tasks with the system. Referring to FIG. 4, the preceding describes a transition from state 4 (user application control) to state 3 (default topology) which is completed without waiting for the user application to become fully operational.

Once the user application is ready to resume control of the topology it can do so returning to the state 4 illustrated in FIG. 4. For example, user application can query the audio/video/ancillary data subsystem 104 for a list of current topologies and then request control of one or more of the topologies. With ownership of the topology, the user application can then modify the topology with instructions to the control engine 228. According to one embodiment the user application takes control of a default topology 500 as illustrated in FIG. 5 and returns to the more complex topology 600 illustrated in FIG. 6.

The options provided by embodiments that allow autonomous state-based topology-control of the audio/video/ancillary data subsystem 104 with the control engine 228 can vary based on the embodiment.

In one embodiment, the bypass 242 is used to connect a selected input 118 directly to a selected output 120 to minimize a disruption in the signal broadcast to viewers, see State 1 of FIG. 4. With the topology 500 or 600 as examples, the bypass 242 can connect the video input 119b directly to the video output 122a if the audio/video/ancillary data subsystem 104 loses power. In this example, the signal broadcast to viewers will include the unscaled video from video stream 244b without audio. The result is advantageous because it provides continued entertainment to the viewer while trouble with the audio/video/ancillary data processing is addressed. According to another embodiment, the FPGA pass-through (see state 2 of FIG. 4) can be employed to provide the same result where power is restored but the control engine 228 has not yet established the default topology in the audio/video/ancillary data subsystem 104.

Although referred to herein as an audio/video/ancillary data processing subsystem 104, in various embodiments, the subsystem 104 can be used to process any one of or any combination of audio data, video data and ancillary data. At any one time, for example, the audio/video/ancillary subsystem 104 can be employed to process solely audio data, solely video data or solely ancillary data, a combination of audio and video data, a combination of audio and ancillary data, a combination of video and ancillary data, or a combination of audio, video and ancillary data.

Further, depending on the embodiment, the term "subsystem" can describe an apparatus and/or system including hardware apparatus, software apparatus or apparatus including both hardware & software that can operate in combination with a host computing system as part of a processing system for the processing of audio, video and/or ancillary data.

Although illustrated as a combination of specialized hardware and software, various aspects of the audio/video/ancillary data subsystem 104 can be implemented as specialized software executing in a general purpose computing device such as a PC, a laptop, a tablet computer or other handheld computing device. The computing device can include, for example, a processor connected to one or memory devices, such as a disk drive, flash drive, memory or other device for storing data. Depending on the embodiment, the computing device can communicate over hardwired or wireless communication interfaces with one or more other devices including, for example, the host system. Accordingly, any of the embodiments described herein can include a computer readable medium in which signals are stored that when executed by a processing system implement aspects described herein.

Further, aspects can be implemented with a specially-programmed, special purpose hardware, for example, an application-specific integrated circuit (ASIC). Aspects of the invention can be implemented in software, hardware or firmware or any combination thereof. Such methods, acts, apparatus, systems, system elements and components thereof may be implemented as part of the computing system described above or as an independent component or components.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

What is claimed is:

1. An apparatus configured to process at least one of video data, audio data and ancillary data to generate an output for broadcast, the apparatus comprising:
   a plurality of processing components; and
   a control engine configured to receive a plurality of topologies established by a user application operating on a host system, wherein each of the plurality of topologies provides a grouping of the plurality of processing components to process the at least one of the video data, the audio data and the ancillary data received by the apparatus, respectively, the control engine configured to operate autonomously relative to the user application and the host system,
   wherein, for each of the plurality of topologies, the control engine is configured to determine commands for execution by the processing components on a frame-by-frame basis, to generate the commands for execution by the processing components on the frame-by-frame basis, and to send the commands to the processing components to process the at least one of the video data, the audio data and the ancillary data on the frame-by-frame basis, and
   wherein the processing components are configured to execute the commands received from the control engine,
   wherein the plurality of topologies includes at least one default topology established by the user application in advance of a failure of either of the host system or the user application operating on the host system,
   wherein the control engine is configured to, in response to a failure of at least one of the user application and the host system, autonomously configure the plurality of processing components into the at least one default topology and to autonomously determine commands for execution by the processing components on a frame-by-frame basis, to generate the commands for execution by the processing components on the frame-by-frame basis, and to send the commands to the processing components to process the at least one of the video data, the audio data and the ancillary data on the frame-by-frame basis, and
   wherein the at least one default topology provides a grouping of the plurality of processing components different than a grouping of the plurality of processing components immediately prior to the failure of at least one of the user application and the host system.

2. The apparatus of claim 1, wherein the control engine is configured to allow the apparatus to continue to operate to process the video data, audio data and ancillary data with any of the plurality of topologies and in accordance with instructions received with the plurality of topologies with minimal further communication from the host system, once the plurality of topologies and instructions are received from the host system by the control engine.

3. The apparatus of claim 1, wherein the control engine is configured to reply to a query from the host system by communicating a selected one of the plurality of topologies to the host system.

4. The apparatus of claim 1, further comprising a general purpose input configured to receive an input that triggers a change from a topology included in the plurality of topologies received from the host system to a different topology.

5. The apparatus of claim 4, wherein the control engine is configured to determine commands for execution by the processing components on the frame-by-frame basis, to generate the commands on the frame-by-frame basis, and to send the commands to the processing components to process the at least one of the video data, the audio data and the ancillary data on the frame-by-frame basis in the different topology without communication from the host system.

6. The apparatus of claim 5, further comprising a non-volatile memory coupled to the control engine,
   wherein the different topology includes a default state and an associated default topology stored in the non-volatile memory by a user application operating on the host system.

7. The apparatus of claim 6, wherein the nonvolatile memory is configured to store a plurality of default topologies.

8. The apparatus of claim 6, wherein the control engine includes a memory, and
   wherein, using at least some of the content of the nonvolatile memory, the memory is programmed for the default topology in response to a failure of the user application.

9. The apparatus of claim 6, wherein the processing components include at least one output, and
   wherein the default state includes a topology that communicates at least some data received by the apparatus to the at least one output.

10. The apparatus of claim 9, wherein a topology operating as a current state includes the at least one output,
   wherein the at least one output is present in a description of the default topology, and
   wherein the topology operating as the current state communicates at least some data received by at least one processing component included in the plurality of processing components to the at least one output.

11. The apparatus of claim 1, wherein, following a resumption of communication between the host system and the control engine following a temporary interruption, the user application operating on the host system queries the control engine for a list of at least one topology operating in a current state.

12. A method of processing at least one of video data, audio data and ancillary data to generate an output for broadcast with a system including a plurality of processing components and a control engine, the method comprising;
  receiving, by the control engine, a plurality of processing topologies established by a user application operating on a host system, the control engine configured to operate autonomously relative to the user application and the host system, the plurality of processing topologies including at least one default topology established by the user application in advance of a failure of either of the host system or the user application operating on the host system;
  grouping the plurality of processing components to process the at least one of the video data, the audio data and the ancillary data received by the system with an identified-topology included in the plurality of processing topologies;
  determining, by the control engine, commands for execution by the processing components on a frame-by-frame basis;
  generating, by the control engine, the commands for execution by the processing components on the frame-by-frame basis;
  sending, by the control engine, commands for execution by the processing components on the frame-by-frame basis;
  processing and outputting, with the plurality of processing components, the at least one of the video data, the audio data and ancillary data, and
  switching, by the control engine, from the identified-topology to the at least one default topology in response to a failure of at least one of the user application and the host system, the at least one default topology providing a different grouping of the plurality of processing components than the identified-topology.

13. The method of claim 12, further comprising operating in the at least one default topology autonomously relative to the host system.

14. The method of claim 12, further comprising establishing a plurality of default topologies.

15. The method of claim 12, further comprising generating the output for a live broadcast with the system.

16. The method of claim 12, further comprising receiving, by the control engine, a request from the user application to modify a processing topology included in the plurality of processing topologies.

17. The apparatus of claim 1, wherein the user application defines the plurality of processing topologies.

* * * * *